Patented Mar. 24, 1931

1,797,843

UNITED STATES PATENT OFFICE

HUGH McCURDY SPENCER, OF NEWARK, NEW JERSEY

TREATMENT OF ESTERS OF CELLULOSE

No Drawing.      Application filed August 22, 1923. Serial No. 658,834.

This invention has for its principal object the preparation of a solvent or of solvents or peptizing agents for the esters of cellulose, particularly nitrocellulose, and relates to improved compositions of matter containing ammonia or other volatile or fixed alkalies or alkaline substances, and to a method for preparing the same.

This invention is useful in dissolving or peptizing the esters of cellulose, particularly nitrocellulose, so that a fluid, semi-fluid or plastic composition results. It is particularly adaptable in reducing the viscosity of those cottons that are too highly or poorly nitrated.

Hitherto the esters of cellulose, and particularly of nitrocellulose, have been dissolved or peptized in non-aqueous solutions by means of such substances as ethyl acetate, amyl acetate, butyl acetate, a mixture containing various proportions of ether and ethyl alcohol, etc. The dissolved or peptized esters of cellulose are frequently thinned or diluted by such substances as toluol, ethyl alcohol, benzol, etc., and in such a thinned condition, with or without other ingredients, are used in the manufacture of artificial leather, lacquers, varnishes, artificial silk, photographic films, toilet articles, windows in automobile curtains, collars, cuffs, small boxes, etc.

Some of the disadvantages of the above outlined operations lie in the fact that the process of dissolving or peptizing the esters of cellulose, and particularly nitrocellulose, is slow and costly. It is slow because the dissolving or peptizing effect of the above-mentioned or other solvents or peptizers for the esters of cellulose takes place slowly, several hours or days being required in ordinary commercial practice to effect a solution or peptization of the esters of cellulose. It is costly because a considerable quantity of solvent or peptizing material is necessary to effect such a peptization or solution of the esters of cellulose, and also because diluents or thinners such as the above-mentioned or other diluents or thinners are frequently required in large quantities to render the peptized cellulose esters sufficient plastic or fluid for commercial application.

I have found that the process of dissolving or peptizing the esters of cellulose is accelerated if the dissolving or peptizing agents, or the diluents or thinners, contain a fixed, or preferably a volatile alkali or alkaline substance. Furthermore, not only is the process of peptization or solution of the esters of cellulose accelerated, but a smaller quantity of such dissolving or peptizing agents and such diluents or thinners is necessary. In this manner a more concentrated solution or colloidal dispersion of the esters of cellulose, particularly nitrocellulose, may be secured, thereby effecting a saving in the quantity of solvents or peptizing agents and diluents or thinners.

I am aware that ammonia in the form of ammoniated cupric hydroxide has been used to dissolve or peptize cellulose, this dissolving or peptizing mixture having been known for many years as "Schweitzer's reagent", but I have found that the presence of water in any alkalinized solvent or peptizer or diluent or thinner for the esters of cellulose and particularly nitrocellulose, has a deleterious and destructive effect upon the film forming properties of such dissolved or peptized esters of cellulose.

The present invention provides a solution of alkalies or alkaline substances, preferably of volatile alkalies, in non-aqueous or substantially non-aqueous solvents or peptizers, diluents or thinners for the esters of cellulose and particularly nitrocellulose.

In general, such alkalinized, non-aqueous solvents or peptizers, diluents or thinners, are prepared by adding to them preferably, but not necessarily, in the absence of the esters of cellulose, anhydrous or substantially anhydrous fixed or volatile alkalies or alkaline compounds, such as caustic soda, sodium carbonate, ammonia, trimethyl amine, sodium bicarbonate, calcium oxide, calcium hydroxide, etc.

Such anhydrous or practically anhydrous fixed or volatile alkalies or alkaline substances may be added to ethyl acetate, amyl acetate, butyl acetate, ether-ethyl alcohol mixture, wood alcohol, benzol, toluol or other solvents or peptizers, diluents or thinners for the esters of cellulose.

It is preferable to dissolve a volatile alkali rather than a fixed alkali or alkaline substance in such solvents or peptizers, diluents or thinners, so that when solutions or colloidal dispersions of a fluid or plastic nature are prepared from the esters of cellulose and such ammoniated solvents or peptizers, diluents or thinners, these solutions or colloidal dispersions, upon drying, will give off all, or a large part of the ammonia, thereby freeing themselves from all or a large part of the volatile alkali, the presence of which may have a deleterious effect upon the life or other valuable properties of the films or other compositions made from such an ammoniated solution or colloidal dispersion of the esters of cellulose.

In case a fixed alkali or alkaline compound is used that is only slightly soluble in the solvents, peptizers, diluents or thinners of the esters of cellulose, it may be necessary to filter such excess of undissolved or unpeptized fixed alkali or alkaline compound preferably before, or, if necessary, after dissolving or peptizing, diluting or thinning the esters of cellulose.

Having described the main general features and characteristics of my invention, I shall now give a few specific examples of my improved products and methods of compounding the same, it being understood, however, that my invention is not restricted to the details given in these examples, but that they are given merely by way of illustrating a few embodiments of my invention.

The following are examples of use with an alkalinized peptizer, an alkalinized diluent, an almost insoluble fixed alkali and a highly soluble fixed alkali respectively:

Example 1

Anhydrous or substantially anhydrous ethyl acetate is saturated with anhydrous or substantially anhydrous ammonia gas, the gain in weight being about 9%.

To 96 parts by weight of dry nitrated cotton add 5 parts by weight of the ammoniated ethyl acetate, 151 parts by weight of ethyl acetate, 308 grams of denatured ethyl alcohol and 23 parts of acetone.

If the ammoniated ethyl acetate has been only partly saturated with ammonia gas, an increased amount of this alkalinized peptizer or solvent, and a correspondingly decreased amount of ethyl acetate, must be added.

If a solution or colloidal dispersion of the esters of cellulose is desired, that contains a higher percentage of such esters of cellulose, then more of such esters of cellulose should be substituted in the above formula, together with less solvents or peptizers, diluents or thinners, excepting the ammoniated ethyl acetate, which should be increased more or less proportionately to the increase in the content of the esters of cellulose.

Similarly, if a decreased content of the esters of cellulose is desired in such a solution or colloidal dispersion, a decreased amount of the esters of cellulose should be substituted in the above formula, together with more solvents or peptizers, diluents or thinners, excepting the ammoniated ethyl acetate, which should be decreased more or less proportionately to the decrease in the content of the esters of cellulose.

Example 2

Anhydrous or subsantially anhydrous (95%) denatured ethyl alcohol is saturated with anhydrous or substantially anhydrous ammonia gas, the gain in weight being about 4%.

To 96 parts by weight of dry nitrated cotton add 5 parts by weight of the ammoniated denatured alcohol, 305 parts of denatured ethyl alcohol, 156 grams of ethyl acetate, 23 grams of acetone.

If the ammoniated denatured alcohol has been only partly saturated, an increased amount of this solvent, and a correspondingly decreased amount of denatured ethlyl alcohol must be added.

If a solution or colloidal dispersion of the esters of cellulose is desired, that contains a higher percentage of such esters of cellulose, then more of such esters of cellulose should be substituted in the above formula, together with less solvents or peptizers, diluents or thinners, excepting the ammoniated alcohol, which should be increased more or less proportionately to the increase in the content of the esters of cellulose.

Similarly, if a decreased content of the esters of cellulose is desired in such a solution or colloidal dispersion, a decreased amount of the esters of cellulose should be substituted in the above formula, together with more solvents or peptizers, diluents or thinners, excepting the ammoniated denatured ethyl alcohol, which should be decreased more or less proportionately to the decrease in the content of the esters of cellulose.

Example 3

Anhydrous or substantially anhydrous carbonate of soda is added in excess to a mixture of 308 grams of denatured ethyl alcohol, 156 grams of ethyl acetate, 23 grams of acetone, and is allowed to remain in this mixture, with or without stirring, for one-half hour more or less. The undissolved or undispersed quota of sodium carbonate is filtered off by any common and effective method of filtration, such as a filter press, or may be centrifuged and thus separated: This mixture of solvents, peptizers, diluents and thinners is added to 96 grams of dry nitrated cotton.

In the same way other anhydrous or substantially anhydrous alkalies or alkaline substances, such as sodium bicarbonate, calcium hydroxide, etc., that are only slightly soluble in any or all of the above or other solvents or peptizers, diluents or thinners for the esters of cellulose, may be employed either separately or in combination with each other.

Furthermore, such undissolved or unpeptized alkalies or alkaline substances may be filtered out or centrifuged after the esters of cellulose have been dissolved or peptized, thinned or diluted by the mixture.

Example 4

One-half parts by weight of anhydrous or substantially anhydrous caustic soda is added to 308 parts of denatured ethyl alcohol, 156 parts of ethyl acetate, 23 parts of acetone, and is allowed to dissolve or to disperse in this mixture, which is then added to 96 grams of dry nitrated cotton.

If a solution or a colloidal dispersion of the esters of cellulose is desired, that contains a higher percentage of such esters of cellulose, then more of such esters of cellulose should be substituted in the above formula, together with less solvents or peptizers, thinners or diluents, and the amount of anhydrous or substantially anhydrous caustic soda should be increased more or less proportionately to the increase of the esters of cellulose.

Similarly, if a decreased content of the esters of cellulose is desired in such a solution or colloidal dispersion, a decreased amount of the esters of cellulose should be substituted in the above formula, together with more solvents or peptizers, diluents or thinners, and the amount of anhydrous or substantially anhydrous caustic soda should be decreased more or less proportionately to the decrease of the esters of cellulose.

In the same way other anhydrous or substantially anhydrous alkalies or alkaline substances, such as potassium hydroxide, sodium ethylate, tri-methyl amine, etc., that are more or less soluble or dispersable in any or all of the above or other solvents or peptizers, diluents or thinners of the esters of cellulose, either separately or in combination with each other, may be employed.

It will be understood that I may substitute for anhydrous or substantially anhydrous ethyl acetate in Example 1 anhydrous or substantially anhydrous amyl acetate, or butyl acetate or ether-ethyl alcohol mixtures, or any other non-aqueous or substantially non-aqueous solvent or peptizer or mixtures of the same, for the esters of cellulose, in which anhydrous or substantially anhydrous gaseous ammonia is soluble, without departing in any way from the scope of my invention.

In the same way I may substitute for anhydrous or substantially anhydrous toluol in Example 2 anhydrous or substantially anhydrous benzol, ethyl or methyl alcohol or any other non-aqueous or substantially non-aqueous diluent or thinner or mixtures of the same, or mixtures of the same and the solvents or peptizers of the esters of cellulose, without departing in any way from the scope of my invention.

Likewise I may substitute for anhydrous or substantially anhydrous carbonate of soda in Example 3 anhydrous or substantially anhydrous calcium hydroxide, calcium oxide, trisodium phosphate, or any other non-volatile alkali or alkaline substance, or mixtures of the same, that is in any way dissolved by, or peptized by, the solvents or peptizers, diluents or thinners of the esters of cellulose, without departing in any way from the scope of my invention.

Finally, in the same way in any of the above examples, I may substitute different anhydrous or substantially anhydrous solvents, peptizers, diluents or thinners of the esters of cellulose or mixtures of the same, with any anhydrous or substantially anhydrous fixed or volatile alkali or alkaline substance, or mixtures of the same, that are in any way dissolved in or peptized by the non-aqueous or substantially non-aqueous solvents, peptizers, diluents or thinners of the esters of cellulose, without in any way departing from the scope of my invention.

It is understood that the foregoing description, whilst explanatory, is not restrictive within the proper field of novelty and equivalency, and that I claim all that legitimately comes within the principles of my invention and the scope of the claims.

I claim:—

1. The process of procuring a concentrated colloidal dispersion of esters of cellulose which consists in incorporating with esters of cellulose a substantially anhydrous alkali in solution.

2. A solvent for the treatment of esters of cellulose, comprising a diluent, a peptizer and a substantially anhydrous alkali soluble therein.

3. A solvent for the treatment of esters of cellulose, comprising a diluent and a substantially anhydrous alkalinized peptizer.

4. A solvent for the treatment of esters of cellulose, comprising a peptizer and a substantially anhydrous alkalinized diluent.

5. A solvent for the treatment of esters of cellulose comprising a substantially anhydrous, alkalinized peptizer.

6. A solvent for the treatment of esters of cellulose, comprising a substantially anhydrous alkalinized diluent.

7. A solvent for the treatment of esters of cellulose, comprising a substantially anhydrous ammoniated diluent.

8. A solvent for the treatment of esters of cellulose, comprising an ammoniated peptizer.

In testimony whereof, I have signed my name to this specification this 20th day of August, 1923.

HUGH McCURDY SPENCER.